United States Patent [19]
Lee et al.

[11] Patent Number: 5,680,767
[45] Date of Patent: Oct. 28, 1997

[54] REGENERATIVE COMBUSTOR COOLING IN A GAS TURBINE ENGINE

[75] Inventors: Ching-Pang Lee; Gary L. Leonard, both of Cincinnati; George A. Coffinberry, West Chester, all of Ohio

[73] Assignee: General Electric Company, Cincinnati, Ohio

[21] Appl. No.: 526,471

[22] Filed: Sep. 11, 1995

[51] Int. Cl.⁶ .................................... F02C 1/00
[52] U.S. Cl. .............. 60/760; 60/747; 60/266; 415/115
[58] Field of Search ................ 60/39.36, 751, 60/752, 760, 746, 747, 754, 266, 39.07; 415/115

[56] References Cited

U.S. PATENT DOCUMENTS

| | | | |
|---|---|---|---|
| H1390 | 1/1995 | Halila et al. | 60/757 |
| 3,605,405 | 9/1971 | Du Bell et al. | 60/39.65 |
| 3,842,597 | 10/1974 | Ehrich | 60/266 |
| 3,845,620 | 11/1974 | Kenworthy | 60/39.65 |
| 3,990,232 | 11/1976 | Campbell | 60/39.66 |
| 4,109,459 | 8/1978 | Ekstedt et al. | 60/39.66 |
| 4,852,355 | 8/1989 | Kenworthy et al. | 60/751 |
| 4,872,312 | 10/1989 | Iizuka et al. | 60/754 |
| 4,896,510 | 1/1990 | Foltz | 60/757 |
| 4,909,032 | 3/1990 | Horiuchi et al. | 60/260 |
| 5,181,379 | 1/1993 | Wakeman et al. | 60/261 |
| 5,305,616 | 4/1994 | Coffinberry | 60/402 |
| 5,392,614 | 2/1995 | Coffinberry | 60/402 |
| 5,397,217 | 3/1995 | DeMarche et al. | 415/115 |
| 5,484,258 | 1/1996 | Isburgh et al. | 415/115 |

FOREIGN PATENT DOCUMENTS

| | | |
|---|---|---|
| 1060095 | 2/1967 | United Kingdom . |
| 2074308 | 10/1981 | United Kingdom . |

*Primary Examiner*—Charles G. Freay
*Attorney, Agent, or Firm*—Andrew C. Hess; Patrick R. Scanlon

[57] ABSTRACT

A combustor, for a gas turbine engine, employing regenerative combustor cooling. The combustion gas flow direction extends generally longitudinally aft of the combustor fuel nozzle. A coolant flowpath between the combustor casing and the combustor liner has: 1) a longitudinally aft inlet in fluid communication with a source of compressor-derived cooling air, of lower temperature and higher pressure than diffused air from the combustor diffuser; and 2) a longitudinally forward outlet in fluid communication with the combustor fuel nozzle for "spent" cooling air to be used for combustion.

8 Claims, 3 Drawing Sheets

5,680,767

REGENERATIVE COMBUSTOR COOLING IN A GAS TURBINE ENGINE

BACKGROUND OF THE INVENTION

The present invention relates generally to a combustor for a gas turbine engine, and more particularly to such a combustor which uses its cooling air first for cooling and then for combustion.

Gas turbine engines (such as turbojet engines, bypass turbofan engines, turboprop engines, turboshaft engines, etc.) may be used to power flight vehicles (such as planes, helicopters, and missiles, etc.) and may also be used to power ships, tanks, electric power generators, pipeline pumping apparatus, etc. For purposes of illustration, the invention will be described with respect to an aircraft bypass turbofan gas turbine engine. However, it is understood that the invention is equally applicable to other types and/or uses of gas turbine engines.

A gas turbine engine includes a core engine having, in serial flow relationship, a high pressure compressor (also called a core compressor) to compress the airflow entering the core engine, a combustor in which a mixture of fuel and the compressed air is burned to generate a propulsive (combustion) gas flow, and a high pressure turbine which is rotated by the propulsive gas flow and which is connected by a larger diameter shaft to drive the high pressure compressor. A typical aircraft bypass turbofan gas turbine engine adds a low pressure turbine (located aft of the high pressure turbine) which is connected by a smaller diameter coaxial shaft to drive a front fan (located forward of the high pressure compressor) which is surrounded by a nacelle and which may also drive a low pressure compressor (located between the front fan and the high pressure compressor). The low pressure compressor sometimes is called a booster compressor or simply a booster. It is understood that the term "compressor" includes, without limitation, high pressure compressors and low pressure compressors. A flow splitter, located between the fan and the first (usually the low pressure) compressor, separates the air which exits the fan into a core engine airflow and a surrounding bypass airflow. The bypass airflow from the fan exits the fan bypass duct to provide most of the engine thrust for the aircraft. Some of the engine thrust comes from the core engine airflow after it flows through the low and high pressure compressors to the combustor and is expanded through the high and low pressure turbines and accelerated out of the exhaust nozzle.

Aircraft bypass turbofan gas turbine engines are designed to operate at high temperatures to maximize engine thrust. Cooling of engine hot section components, such as the combustor, is necessary because of the thermal "redline" limitations of the materials used in the construction of such components. Typically such cooling of the combustor is accomplished by using a significant amount of air which exits the compressor. This cooling air bypasses the combustion chamber and is used to cool the combustor (e.g., the combustor liners) as well as to cool, for example, turbine components. The cooling air, after cooling the combustor (and turbine components) re-enters the gaspath downstream of the combustor. Because this cooling air is not available inside the combustion chamber, the combustor has to operate at a higher fuel to air ratio which results in a higher combustor temperature in order to provide a desired turbine inlet temperature which is required for engine power and efficiency. However, the higher combustion chamber temperature generates more undesirable NOx emissions.

SUMMARY OF THE INVENTION

It is an object of the invention to provide a combustor with improved combustor cooling for use in a gas turbine engine.

In a preferred embodiment, the invention provides a combustor for a gas turbine engine wherein the combustor includes a casing and a liner, with the liner positioned near the casing and with the liner at least partially bounding a combustion chamber. A fuel injector has its fuel nozzle placed in the combustion chamber in which the combustion gas flow direction extends generally longitudinally aft from the fuel nozzle. A diffuser, positioned longitudinally forward of the fuel nozzle, has an inlet which is in fluid communication with the engines's compressor and has an outlet which is in fluid communication with the fuel nozzle. A coolant flowpath, between the casing and the liner, has an inlet near the liner's longitudinally aft portion and has an outlet near the liner's longitudinally forward portion. The inlet is in fluid communication with a source of cooling air with the source having an input port in fluid communication with the compressor and with the cooling air of lower temperature and higher pressure than diffused air from the diffuser, and the outlet is in fluid communication with the fuel nozzle.

Several benefits and advantages are derived from the gas turbine engine combustor of the invention. Cooling air, derived from the compressor, is used to first cool the turbine nozzle and combustor and then is used for combustion in the combustion chamber. This maximizes the air available inside the combustion chamber, permitting a lower gas temperature therein which lowers NOx emissions while still providing a desired turbine inlet temperature, as can be appreciated by those skilled in the art.

BRIEF DESCRIPTION OF THE DRAWINGS

The accompanying drawings illustrate a preferred embodiment of the present invention wherein.

In the drawings, like reference numerals designate identical or corresponding parts throughout the respective figures. Unnumbered arrows indicate the direction of airflow.

DETAILED DESCRIPTION OF THE INVENTION

Figure 1:
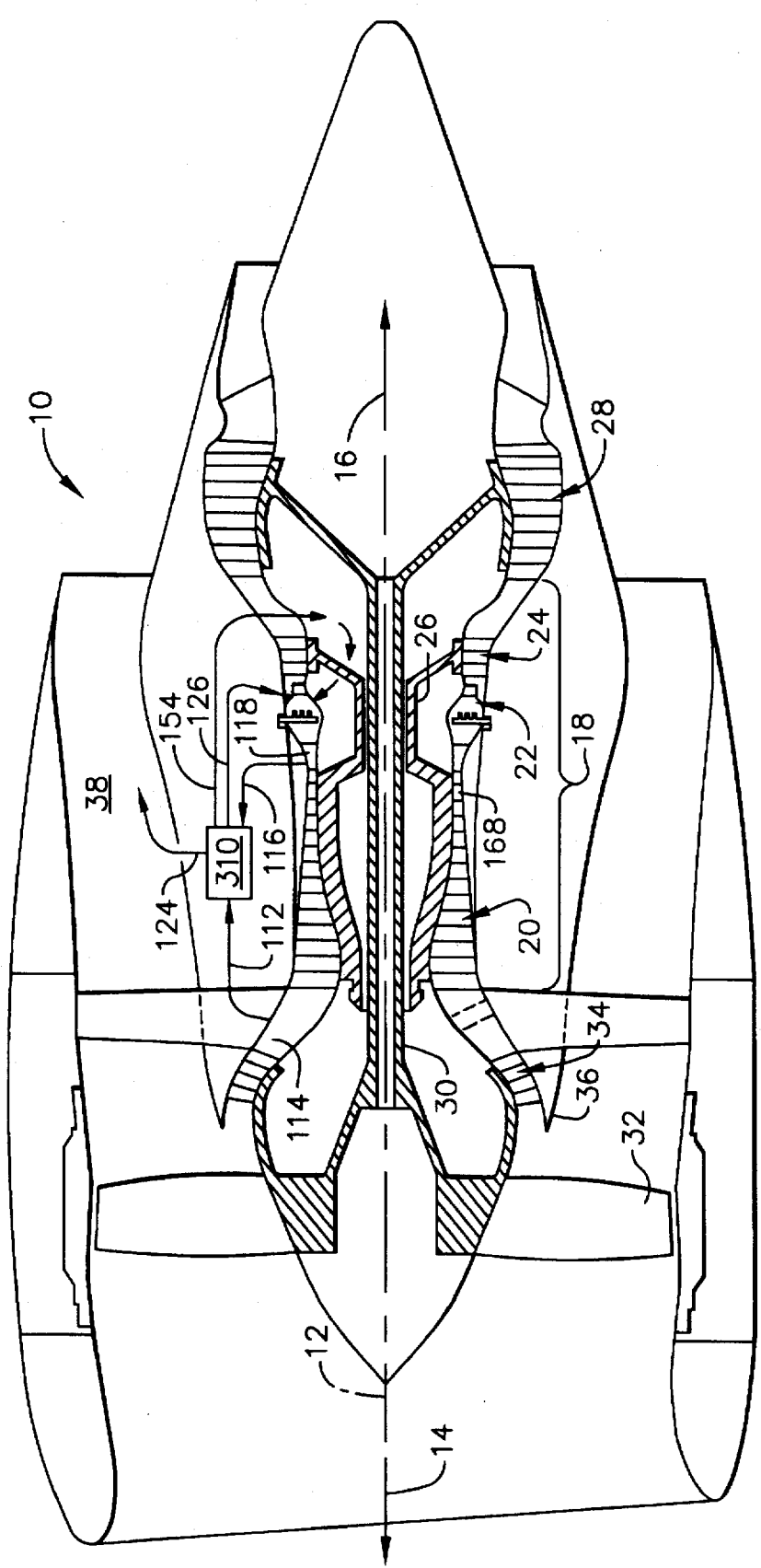
FIG. 1 is a schematic side view of an aircraft bypass turbofan gas turbine engine which employs the combustor (shown as a triple-dome combustor) of the invention and a compressor-derived source of combustor cooling air.

Referring now to FIG. 1, there is illustrated an aircraft bypass turbofan gas turbine engine 10 having a generally longitudinally extending axis or centerline 12 generally extending forward 14 and aft 16. The bypass turbofan engine 10 includes a core engine (also called a gas generator) 18 which comprises a high pressure compressor or core compressor 20, a combustor 22, and a high pressure turbine 24, all arranged in a serial, axial flow relationship. A larger diameter annular drive shaft 26, disposed coaxially about the centerline 12 of the engine 10, fixedly interconnects the high pressure compressor 20 and the high pressure turbine 24.

The core engine 18 is effective for generating combustion gases. Pressurized air from the high pressure compressor 20 is mixed with fuel in the combustor 22 and ignited, thereby generating combustion gases. Some work is extracted from these gases by the high pressure turbine 24 which drives the high pressure compressor 20. The combustion gases are discharged from the core engine 18 into a low pressure or power turbine 28. The low pressure turbine 28 is fixedly attached to a smaller diameter annular drive shaft 30 which is disposed coaxially about the centerline 12 of the engine 10 within the larger diameter annular drive shaft 26. The smaller diameter annular drive shaft 30 rotates a forward row of fan rotor blades 32. The smaller diameter annular drive shaft 30 also rotates a low pressure compressor 34 (also called a booster compressor or simply a booster). A flow splitter 36, located between the fan blades 32 and the low pressure compressor 34, separates the air which exits the fan into a core engine airflow which exits the exhaust nozzle and a surrounding bypass airflow which exits the fan bypass duct 38.

FIG. 1 also shows a source 310 of cooling air used for cooling the combustor 22. Such source and other such sources of cooling air are described (using the same part numbers herein and wherein "source of cooling air" is called "engine cooling system") in U.S. Pat. No. 5,392,614 entitled "Gas Turbine Engine Cooling System", by George A. Coffinberry, issued Feb. 28, 1995, incorporated herein by reference. The source 310 of cooling air receives air: from a duct 112 which bleeds air from the low pressure compressor discharge region 114; and from a duct 116 which bleeds air from the high pressure compressor discharge region 118. The source 310 of cooling air discharges air: to a duct 124 which routes air to the fan bypass duct 38; to a duct 126 which routes air to the combustor 22 (and which could also route air to the high pressure turbine 24 region); and to a duct 154 which routes air to the low pressure turbine 28 region.

Figure 2:
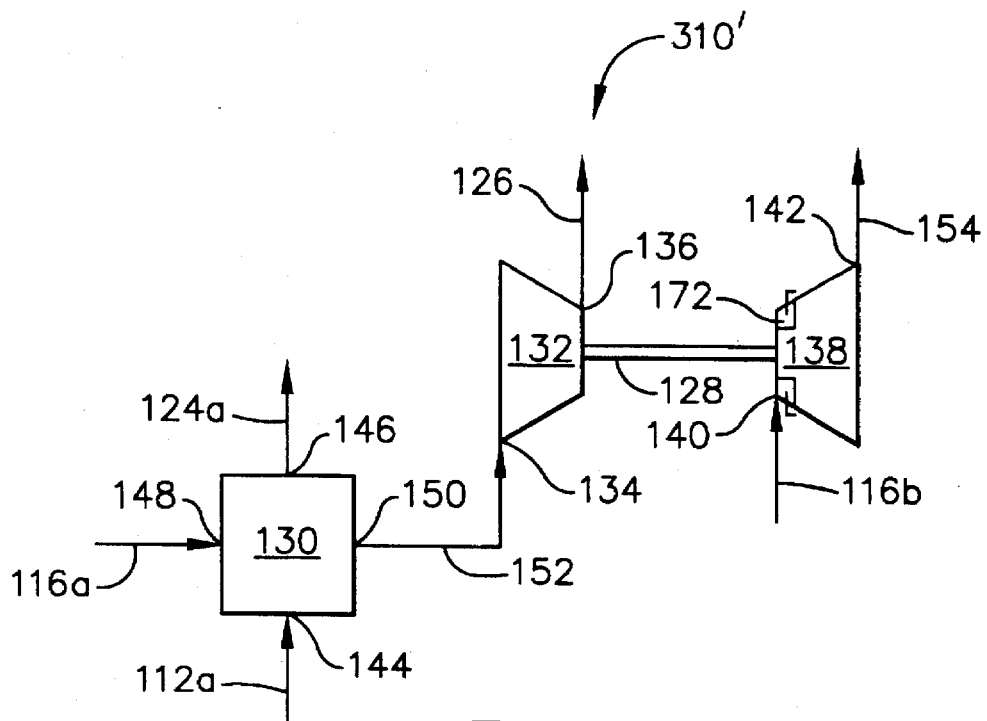
FIG. 2 is a block diagram of the compressor-derived source of combustor cooling air of FIG. 1.

FIG. 2 shows a first design 310' of the source 310 of cooling air comprising a turbocompressor 128 and a first (single) heat exchanger 130. The turbocompressor 128 has a compressor section 132 including an inlet 134 and an outlet 136 and has a turbine section 138 including an inlet 140 and an outlet 142. Preferably the turbocompressor 128 has air bearings. The first heat exchanger 130 has an inlet 144 and an outlet 146 for a first airflow providing cooling to the first heat exchanger 130 and has an inlet 148 and an outlet 150 for a second airflow receiving cooling from the first heat exchanger 130. The first airflow inlet 144 of the first heat exchanger 130 is in fluid communication with lower pressure and temperature air (such as with a portion of the air from the low pressure compressor discharge region 114 through duct 112/112a as shown in FIGS. 1 and 2). The second airflow inlet 148 of the first heat exchanger 130 is in fluid communication with higher pressure and temperature air from the engine compressor (such as with a portion of the air from the high pressure compressor discharge region 118 through duct 116/116a as shown in FIGS. 1 and 2). The first airflow outlet 146 of the first heat exchanger 130 preferably is in fluid communication with the fan bypass duct 38 through duct 124a (and preferably discharges such air into the fan bypass duct 38 with an aft component of velocity). The second airflow outlet 150 of the first heat exchanger 130 is in fluid communication with the inlet 134 of the compressor section 132 of the turbocompressor 128 through duct 152. The outlet 136 of the compressor section 132 of the turbocompressor 128 is in fluid communication with (and thereby is used to cool) the combustor 22 through duct 126. It is noted that duct 126 could also be used to cool at least a portion of the high pressure turbine 24. The inlet 140 of the turbine section 138 of the turbocompressor 128 is in fluid communication with higher pressure and temperature air from the engine compressor (such as with a portion of the air from the high pressure compressor discharge region 118 through duct 116/116b as shown in FIGS. 1 and 2). The term "pressure" as used herein means total pressure (i.e., static pressure plus dynamic pressure). It is noted that duct 154 could be used to direct cooling air to cool at least a portion of the low pressure turbine 28.

Figure 3:
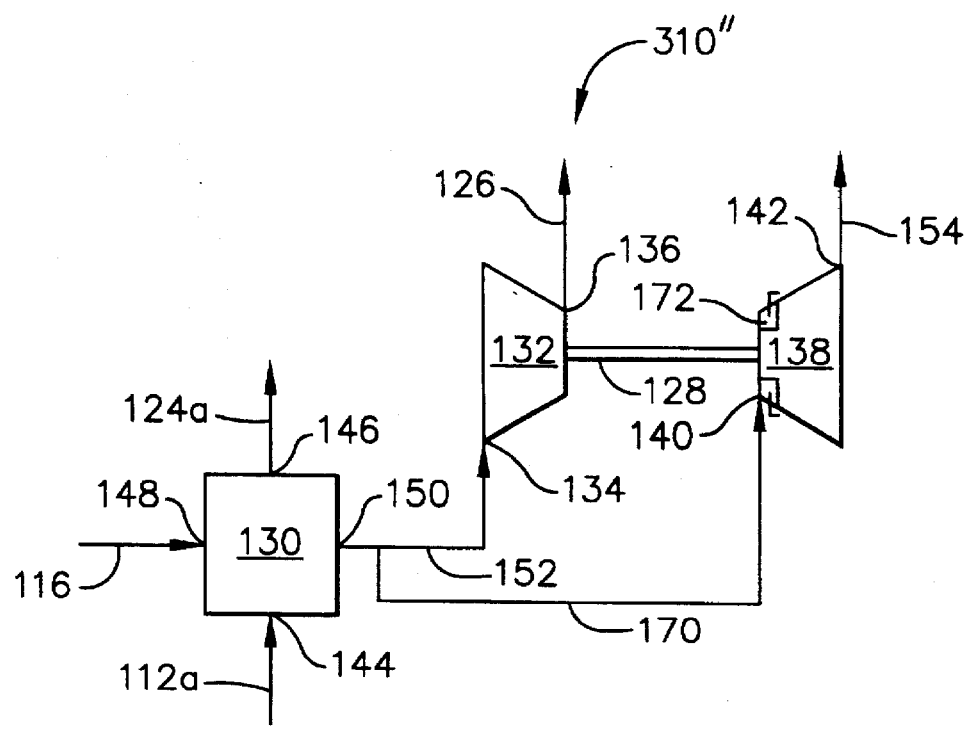
FIG. 3 is an alternate embodiment of the compressor-derived source of combustor cooling air of FIG. 2.

FIG. 3 shows a second design 310" of the source 310 of cooling air which is identical to the first design 310' of FIG. 2 previously discussed, but with one difference. In the second design 310" of FIG. 3, the turbine section 138 of the turbocompressor 128 has its inlet 140 in fluid communication with the second airflow outlet 150 of the first heat exchanger 130 (via duct 170) instead of being in fluid communication with higher temperature air from the engine compressor, such as a portion of discharge air from the high pressure compressor discharge region 118 (via duct 116b as seen in the first design 310' of FIG. 2).

In a preferred arrangement (not shown), the source 310 of cooling air used for cooling the combustor 22 is also used to cool not only the high pressure turbine 24 portion and the low pressure turbine 28 portion of the engine 10, but also the aft portion 168 of the high pressure compressor 20.

It is noted that FIGS. 1–3 disclose an aircraft bypass turbofan type of gas turbine engine in which the inlet 144 of the first heat exchanger 130 is connected to duct 112a from the low pressure compressor discharge region 114 and in which the outlet 146 of the first heat exchanger 130 is connected to duct 124a leading to the fan bypass duct 38. However, for a turboshaft type of gas turbine engine (not shown) used to drive an electric power generator, a preferred arrangement includes the inlet 144 being in fluid communication with (for example) natural-gas engine fuel downstream of the fuel controller and includes fuel exiting the outlet 146 to be injected into the combustor portion of the engine.

For certain applications, the turbine section 138 of the turbocompressor 128 discussed above includes a row of variable area nozzle vanes 172 which may be controlled by the engine controller (not shown). As can be appreciated by those skilled in the art, controllably varying the area of the nozzle vanes 172 will vary the flow of cooling air to better match the cooling needs (which vary during engine operation) of those portions of the engine being cooled.

Figure 4:
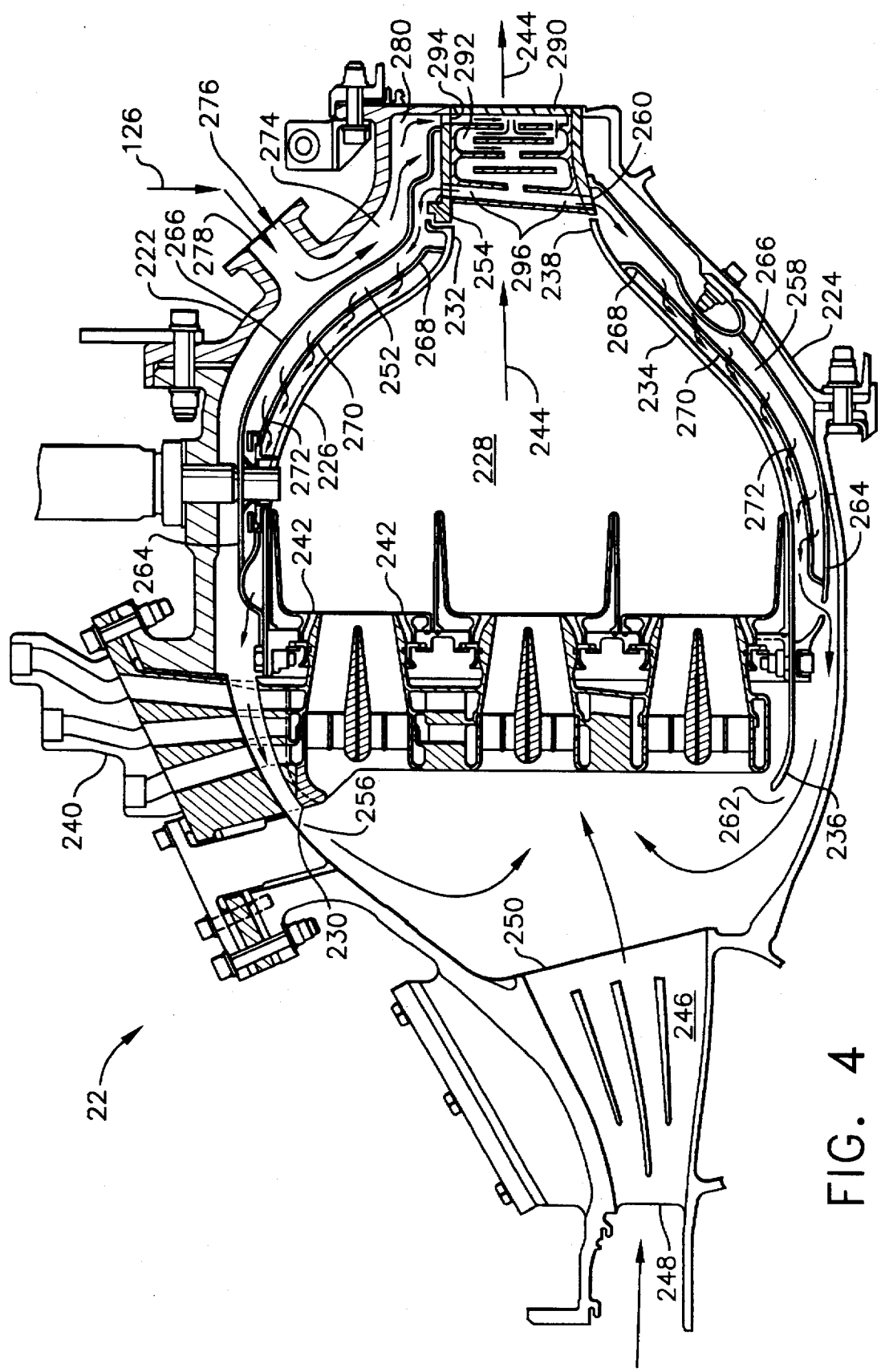
FIG. 4 is an enlarged schematic side view of the combustor (shown as a triple-dome combustor) of FIG. 1.

FIG. 4 (in view of FIGS. 1–3) illustrates a preferred embodiment of the combustor 22 of the present invention. Although the combustor 22 of FIG. 4 is of the triple-dome annular type, the invention is equally applicable to a single or double-dome annular type as well as to other types of combustors for gas turbine engines, such as to cellular (can) combustor systems and to cannular combustor systems, as can be appreciated by those skilled in the art.

The combustor 22 includes a combustor outer casing 222 and a combustor inner casing 224. The combustor 22 further includes a combustor outer liner 226 which is disposed proximate the combustor outer casing 222, which at least partially bounds a combustion chamber 228, and which has generally longitudinally forward and aft portions 230 and 232. Likewise, the combustor 22 also includes a combustor inner liner 234 which is disposed proximate the combustor inner casing 224, which at least partially bounds the combustion chamber 228, and which has generally longitudinally forward and aft portions 236 and 238. For the purposes of describing the invention, it is understood that the longitudinally forward portion of the combustor inner and outer liners includes the inner and outer combustor cowls, and the like. Preferably, each combustor liner 226/234 is an imperforate combustor liner with respect to cooling air (i.e., the liner itself has no cooling air holes). The combustor 22 has a fuel injector 240 having a fuel nozzle 242 disposed in the combustion chamber 228. It is noted that the combustion gas flow direction 244 in the combustion chamber 228 extends generally longitudinally aft from the fuel nozzle 242. The combustor 22 also has a diffuser 246 disposed longitudinally forward of the fuel nozzle 242, with the diffuser 246 having an inlet 248 in fluid communication with the high pressure compressor 20 of the gas turbine engine 10 and having an outlet 250 in fluid communication with the fuel nozzle 242.

The combustor 22 contains an outer coolant flowpath 252 between the combustor outer casing 222 and the combustor outer liner 226, such outer coolant flowpath 252 having an inlet 254 proximate the longitudinally aft portion 232 of the combustor outer liner 226 and has an outlet 256 proximate the longitudinally forward portion 230 of the combustor outer liner 226. The inlet 254 is in fluid communication (via duct 126) with the source 310 of cooling air with such source 310 having an input port (e.g., inlet 148 of FIGS. 2 or 3) in fluid communication with the high pressure compressor 20 (e.g., through duct 116a of FIG. 2 or through duct 116 of FIG. 3). The source 310 provides cooling air of lower temperature and higher pressure (i.e., total pressure) than that of diffused air from the diffuser 246, as can be appreciated by those skilled in the art. The outlet 256 is in fluid communication with the fuel nozzle 242.

Likewise, the combustor 22 also contains an inner coolant flowpath 258 between the combustor inner casing 224 and the combustor inner liner 234, such inner coolant flowpath 258 having an inlet 260 proximate the longitudinally aft portion 238 of the combustor inner liner 234 and has an outlet 262 proximate the longitudinally forward portion 236 of the combustor inner liner 234. Like the outer coolant flowpath 252 inlet 254, inlet 260 is in fluid communication (via duct 126) with the source 310 of cooling air. Again, the source 310 provides cooling air of lower temperature and higher pressure (i.e., total pressure) than that of diffused air from the diffuser 246, as can be appreciated by those skilled in the art. The outlet 262 is in fluid communication with the fuel nozzle 242.

In an exemplary detailed design of the outer and inner coolant flowpaths 252 and 258, their outlets 256 and 262 are each disposed longitudinally forward of the fuel nozzle 242 (so that "spent" cooling air exiting such outlets 256/262 mixes with diffused air from the diffuser outlet 250 before entering the combustion chamber 228). Each coolant flowpath 252/258 includes a shield 264 having a portion 266 spaced apart from and disposed between its respective combustor liner 226/234 and combustor casing 222/224, and each coolant flowpath further includes a plate 268 having a portion 270 with impingement cooling holes 272. The plate portion 270 is spaced apart from and disposed between its respective combustor liner 226/234 and shield 264. Each coolant flowpath inlet 254/260 receives cooling air between its respective plate 268 and shield 264.

An introductory flowpath, such as outer introductory flowpath 274 between the outer combustor casing 222 and the respective shield 264 has a longitudinally forward segment 276 including an inlet 278 in the outer combustor casing 222 and has a longitudinally aft segment 280 disposed longitudinally aft of the inlet 254 of the outer coolant flowpath 252. The introductory flowpath inlet 278 is in fluid communication with the source 310 of cooling air (via duct 126) and the longitudinally aft segment 280 is in fluid communication with the inlet 254 of the outer coolant flowpath 252.

Preferably, the combustor 22 includes a row of nozzle vanes 290 disposed proximate the longitudinally aft portion 232/238 of each combustor liner 226/234 and having an internal coolant passageway 292 with a coolant entrance 294 in fluid communication with the longitudinally aft segment 280 of the respective introductory flowpath 274 and with a coolant exit 296 in fluid communication with the inlet 254/260 of the respective coolant flowpath 252/258.

During engine operation, the combustor 22 has its combustor liners 226/234 impingement cooled, with compressor-derived cooling air, from aft (where the coldest cooling air is most efficiently used to cool the hottest combustor regions) to forward, with the "spent" cooling air then being introduced into the combustion chamber 228. Analysis has shown that the regenerative combustor cooling of the invention works only when the "spent" cooling air has sufficient pressure to re-enter into the combustion chamber 228 and therefore requires a source of cooling air such as the turbo-pump source 310 previously described herein. To reduce the pumping power requirement, the amount of cooling air required has to be minimized. Since the cooling air requirement is proportional to the air temperature, it is desirable to have the source 310 pre-cool (via heat exchanger 130) the cooling air to a lower temperature, as has been previously described herein. In one example, computer simulations showed a combustor chamber flame temperature reduction from 1,844 degrees Centigrade to 1546 degrees Centigrade and a NOx reduction from greater than 50 parts per million (ppm) to less than 8 ppm by use of the regenerative combustor cooling of the invention, while still providing the desired turbine inlet temperature.

The foregoing description of a preferred embodiment of the invention has been presented for purposes of illustration. It is not intended to be exhaustive or to limit the invention to the precise form disclosed, and obviously many modifications and variations are possible in light of the above teachings. For example, it is understood that the phrase "engine compressor" includes any low, intermediate, and/or high pressure engine compressor. Further, introduction of the cooling air could be done through an inner introductory flowpath instead of or in conjunction with the outer introductory flowpath shown. Such modifications and variations, and other modifications and variations, are all within the scope of the claims appended hereto.

I claim:

1. A combustor for a gas turbine engine having a compressor, said combustor comprising:

(a) a casing;

(b) a liner disposed proximate said casing, at least partially bounding a combustion chamber, and having generally longitudinally forward and aft portions;

(c) a fuel injector having a fuel nozzle disposed in said combustion chamber;

(d) a combustion gas flow direction in said combustion chamber extending generally longitudinally aft from said fuel nozzle;

(e) a diffuser disposed longitudinally forward of said fuel nozzle and having an inlet in fluid communication with said compressor and an outlet in fluid communication with said fuel nozzle; and (f) a coolant flowpath between said casing and said liner having an inlet proximate said longitudinally aft portion of said liner and having an outlet proximate said longitudinally forward portion of said liner, said inlet in fluid communication with a source of cooling air with said source having an input port in fluid communication with said compressor and with said cooling air of lower temperature and higher pressure than diffused air from said diffuser, and said outlet in fluid communication with said fuel nozzle, wherein said coolant flowpath includes a shield having a portion spaced apart from and disposed between said liner and said casing, and a plate having a portion with impingement cooling holes, said plate portion spaced apart from and disposed between said liner and said shield.

2. The combustor of claim 1, wherein said outlet of said coolant flowpath is disposed longitudinally forward of said fuel nozzle.

3. The combustor of claim 1, wherein said inlet receives said cooling air between said plate and said shield.

4. The combustor of claim 3, wherein said liner is an imperforate liner with respect to said cooling air.

5. The combustor of claim 3, wherein said casing is a combustor outer casing and said liner is a combustor outer liner.

6. The combustor of claim 3, wherein said casing is a combustor inner casing and said liner is a combustor inner liner.

7. The combustor of claim 3, also including an introductory flowpath between said casing and said shield having a longitudinally forward segment including an inlet in said casing and having a longitudinally aft segment disposed longitudinally aft of said inlet of said coolant flowpath, said introductory flowpath inlet in fluid communication with said source of cooling air and said longitudinally aft segment in fluid communication with said inlet of said coolant flowpath.

8. The combustor of claim 7, also including a row of nozzle vanes disposed proximate said longitudinally aft portion of said liner and having an internal coolant passageway with a coolant entrance in fluid communication with said longitudinally aft segment of said introductory flowpath and a coolant exit in fluid communication with said inlet of said coolant flowpath.

* * * * *